(12) United States Patent
Takeuchi et al.

(10) Patent No.: US 6,672,652 B2
(45) Date of Patent: Jan. 6, 2004

(54) FRONT END STRUCTURE OF A VEHICLE

(75) Inventors: Akihide Takeuchi, Tokyo (JP); Yoshiyuki Ikeda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/172,343

(22) Filed: Jun. 13, 2002

(65) Prior Publication Data

US 2002/0190542 A1 Dec. 19, 2002

(30) Foreign Application Priority Data

Jun. 15, 2001 (JP) ........................................ 2001-182043

(51) Int. Cl.$^7$ ............................................. B60R 27/00
(52) U.S. Cl. ............................... 296/193.09; 296/203.02
(58) Field of Search ....................... 296/193.09, 203.02; 293/102, 120, 132, 133, 136, 115; 180/68.4, 68.1

(56) References Cited

U.S. PATENT DOCUMENTS

| | | | | |
|---|---|---|---|---|
| 4,054,045 A | * | 10/1977 | King, Jr. ................. | 15/104.05 |
| 5,066,057 A | * | 11/1991 | Furuta et al. .............. | 293/121 |
| 5,271,473 A | * | 12/1993 | Ikeda et al. ............... | 296/194 |
| 5,499,690 A | * | 3/1996 | Shearn et al. .............. | 296/194 |
| 5,573,299 A | * | 11/1996 | Masuda ..................... | 296/194 |
| 6,106,039 A | * | 8/2000 | Maki ........................ | 293/132 |
| 6,155,633 A | * | 12/2000 | Minami et al. .............. | 296/194 |
| 6,216,810 B1 | * | 4/2001 | Nakai et al. ................ | 296/194 |
| 6,273,496 B1 | * | 8/2001 | Guyomard et al. ......... | 296/194 |
| 6,347,823 B1 | * | 2/2002 | Ozawa et al. ............... | 296/194 |
| 6,398,275 B1 | * | 6/2002 | Hartel et al. ............... | 293/102 |
| 6,428,065 B2 | * | 8/2002 | Sato et al. .................. | 293/102 |
| 6,450,276 B1 | * | 9/2002 | Latcau ..................... | 296/194 |
| 2001/0045761 A1 | * | 11/2001 | Ozawa et al. ............... | 296/194 |
| 2002/0063433 A1 | * | 5/2002 | Gotanda et al. ............. | 293/132 |

FOREIGN PATENT DOCUMENTS

JP  7-172345  7/1995  ........... B62D/25/08

* cited by examiner

Primary Examiner—D. Glenn Dayoan
Assistant Examiner—Lori L Coletta
(74) Attorney, Agent, or Firm—Darby & Darby

(57) ABSTRACT

A module carrier incorporating components of a cooling system has a frame structure with frames provided on upper and lower sides thereof and a pair of stays supporting both side ends of the frames. Two fitting faces formed on each of the stays are fixed onto a front edge and a member bracket of a front side member. A pair of the front side members are provided on both sides in a widthwise direction of a vehicle. A lower frame is supported against the front side member by a truss structure provided in a longitudinal direction of the vehicle body. If an impact load is applied from the front side of the vehicle body to the lower frame, it is possible to receive such impact load securely and to generate a reactive force. Therefore, if a leg of a pedestrian collides from the frontside of the vehicle body, such reactive force is effective for scooping up a lower leg for protection.

12 Claims, 3 Drawing Sheets

FRONT END STRUCTURE OF A VEHICLE

BACKGROUND OF THE INVENTION

1. Field of the Invention

The present invention relates to a front end structure of a vehicle, more particularly to the front end structure of a vehicle body frame equipped with a module carrier.

The present application claims priority from Japanese Patent Application No. 2001-182043, the disclosure of which is incorporated herein by reference for all purposes.

2. Description of the Related Art

Conventionally, a front end of the vehicle body frame is joined to and incorporated into front side members provided on right and left sides of a vehicle body and a front wheel apron by welding. Accordingly, an engine room is formed into a box shape with opening provided on top and bottom sides thereof. For this reason, in an assembly process, an operator is forced to perform the prosess in uncomfortable positions such as looking into the engine room from above or below the vehicle body.

Moreover, if a radiator panel constituting the front end is damaged by a light collision on a front side, it is not possible to replace just only the radiator panel because the front end is formed integrally with the vehicle body frame. As a consequence, work procedures for replacement of components are increased and the number of components for replacement is also increased, whereby too much expense is incurred upon such replacement. In addition, it is not possible to change the radiator panel and components related thereto, which collectively constitute the front end, into lightweight materials such as plastics. Such limitation constitutes obstacles to achieve a weight reduction or a reduction of moment of inertia.

As countermeasures for the foregoing problems, various technologies have been disclosed in the past. According to those technologies, the front end panel is provided separately from the vehicle body frame and the front end panel is detached from the vehicle body frame in the assembly process so as to effectuate the assembly operations from the front of the vehicle body into an engine room. Moreover, assembled components such as a radiator and headlamps are fitted onto the front end panel to form a modularized front end panel. Thereafter, the modularized front end panel is fixed onto the vehicle body frame by bolts or the like.

For example, Japanese Patent Application Laid-Open No. Hei. 7-172345 discloses a technology, in which the front end panel is fixed onto a bumper beam extending in a widthwise direction of the vehicle, and bosses protruding backward from both ends of the bumper beam are fastened to front side members with the bolts, whereby the front end panel is sandwiched and fixed between the bumper beam and a vehicle body frame.

However, according to the prior art described above, the front end panel is just sandwiched and fixed between front end faces of the front side members and the bumper beam. Therefore, if an impact is applied from the front to a lower end of the front end panel, a large bending moment is generated at a portion sandwiched between the front side members and the bumper beam as a pivot. Therefore, the prior art has a problem of weak strength because sufficient resistance against an impact load cannot be obtained.

Incidentally, when the strength is insufficient in the direction of the lower end of the front end panel, if a leg of a pedestrian hits a front bumper, the lower end of the front end panel tends to be inclined backward of the vehicle body due to an impact energy from the leg. If the front end panel is inclined backward of the vehicle body, both upper leg and lower limb(legs) of the pedestrian tend to be bent at a knee joint toward the vehicle body so that the lower limb is caught into a lower part of the vehicle body. Such an aspect is not preferable in terms of pedestrian protection.

SUMMARY OF THE INVENTION

In consideration of the foregoing problems, it is an object of the present invention to provide a front end structure of a vehicle including at least a part of a front end panel being modularized as separate components, in which rigidity against an impact load to be applied from a front side of a vehicle body to a lower end of the modularized part is enhanced so as to receive the impact load positively, and the front end structure being capable of protecting a leg of a pedestrian.

To attain the foregoing object, an aspect of the present invention is characterized by the front end structure of the vehicle, in which a module carrier is formed with a carrier upper frame and a carrier lower frame each extending in a widthwise direction of the vehicle and a stay extending in a vertical direction to connect both side ends of the two frames, and the module carrier is fixed onto a front part of a vehicle body frame to constitute at least a part of a front end. Here, the front end structure includes a first fitting face which is provided on the stay, and a second fitting face which is provided on a side closer to a rear end of the vehicle body than the first fitting face, and the both fitting faces are fixed onto the vehicle body frame.

In this structure, the first fitting face provided on the stay which constitutes the module carrier, and the second fitting face positioned closer to the rear end of the vehicle body than the first fitting face are fixed onto the vehicle body frame, whereby a lower part of the module carrier is supported on the vehicle body frame with a truss structure. Accordingly, the module carrier can receive an impact load being applied from the front of the vehicle body to the carrier lower frame.

In another aspect of the present invention, the present invention is characterized by a front bumper beam extending in the widthwise direction of the vehicle and being fastened to the vehicle body frame so as to sandwich the first fitting face together with the vehicle body frame.

In still another aspect of the invention, it is characterized by the front bumper beam being temporarily fitted onto the first fitting face with a temporary fastener, and a pilot pin being provided on a tip of the temporary fastener so as to be engaged into a pilot hole formed on a front portion of the vehicle body frame.

In still another aspect of the present invention, it is characterized by the front bumper beam being temporarily fitted onto the first fitting face with a temporary fastener, a pilot member being formed to protrude from a front edge of the vehicle body frame, and a pilot hole to be engaged with the pilot member being formed on at least any one of the first fitting face and the front bumper beam.

In still further another aspect of the present invention, it is characterized by a front part of the carrier lower frame protruded further forward of the vehicle body than a front part of the carrier upper frame, an upper stage shock absorber being provided on a front face of the front bumper beam, a lower stage shock absorber being provided on a front face of the carrier lower frame, and rigidity in a longitudinal(back-to-front) direction of the lower stage shock absorber being setted higher than the rigidity of the upper stage shock absorber.

In still another aspect of the present invention, it is characterized by auxiliary components of a cooling system being integrated on the module carrier.

BRIEF DESCRIPTION OF THE DRAWINGS

These and other objects and advantages of the present invention will become understood from following descriptions with reference to accompanying drawings, wherein.

DETAILED DESCRIPTION OF THE PREFERRED EMBODIMENTS

Figure 1:
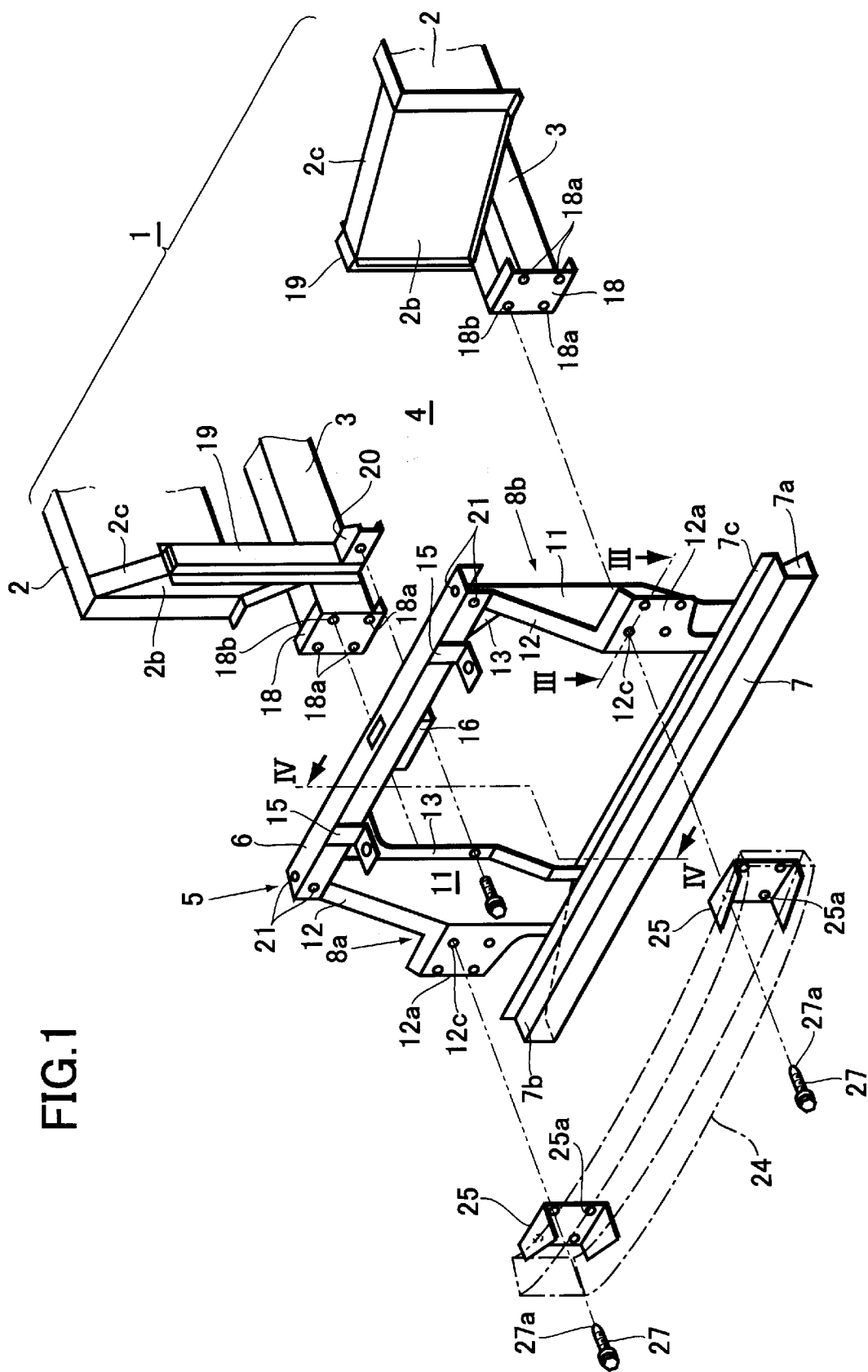
FIG. 1 is an exploded perspective view of a front end of a vehicle.
Figure 2:
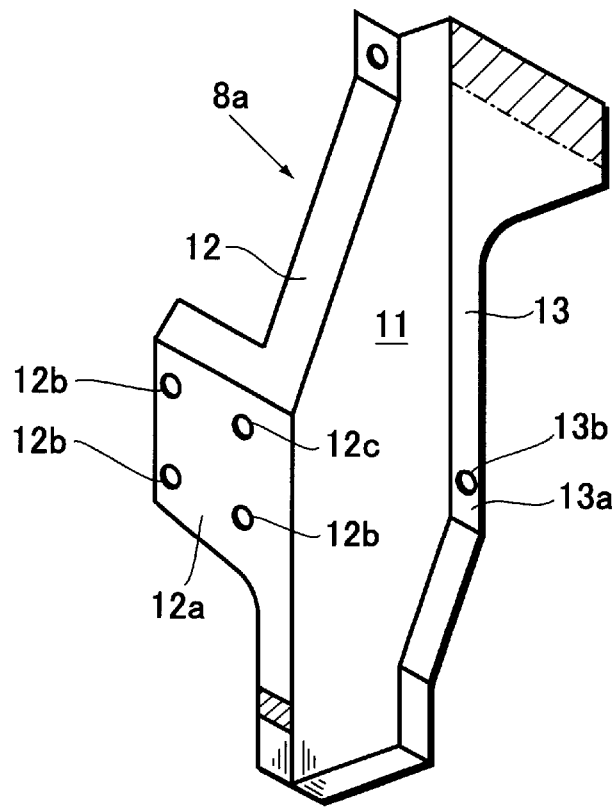
FIG. 2 is a perspective view of a stay on a right side of a vehicle body.
Figure 3:
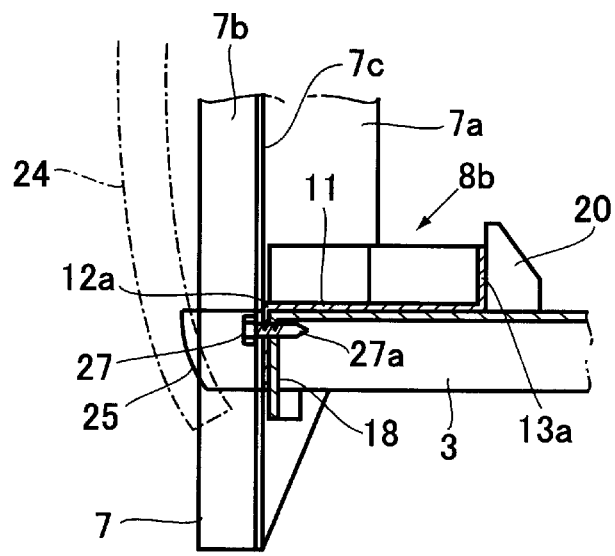
FIG. 3 is a cross-sectional view taken along the line III—III in FIG. 1.
Figure 4:
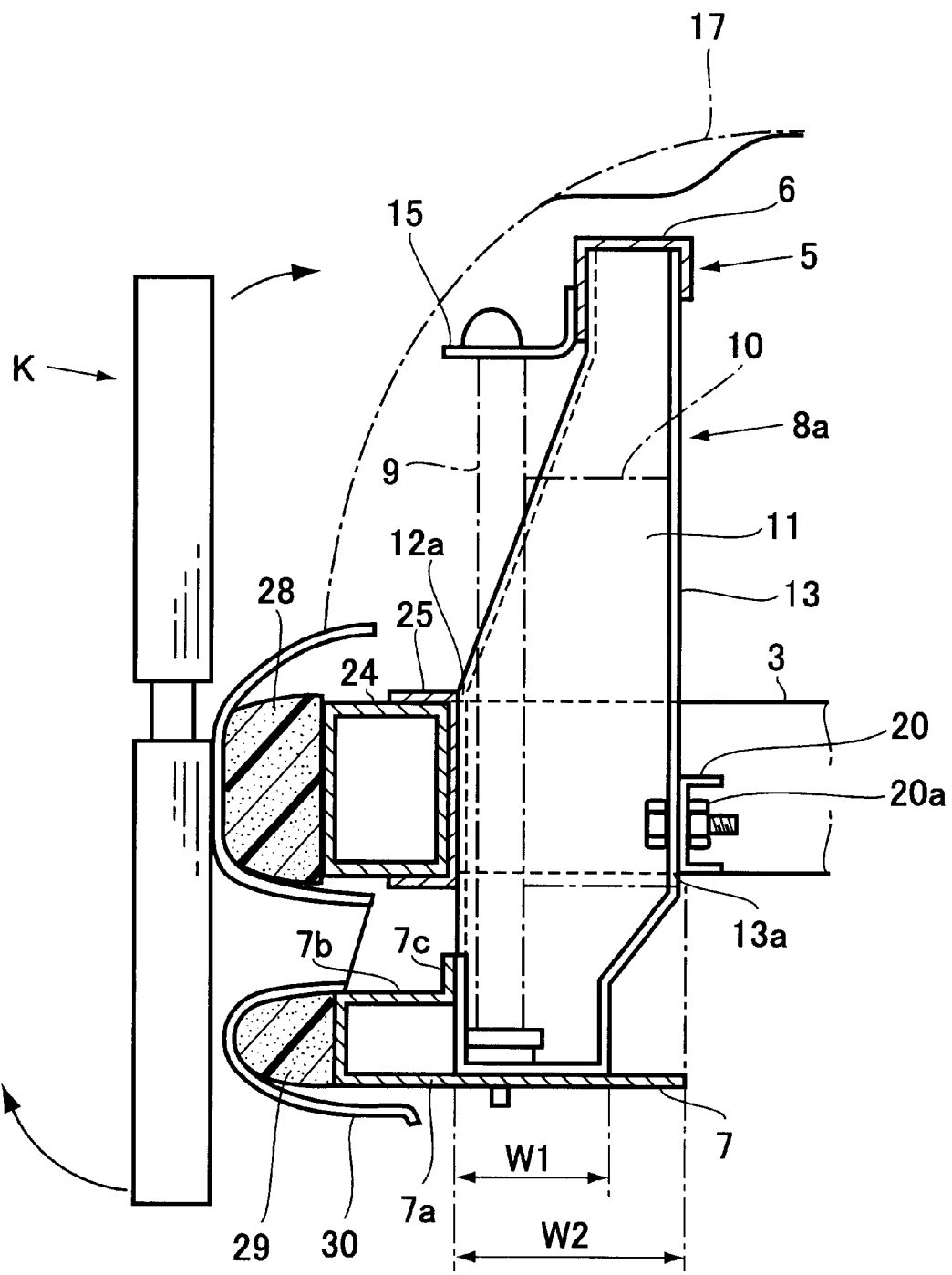
FIG. 4 is the cross-sectional view taken along the line IV—IV in FIG. 1.

Now, an embodiment of the present invention will be described with reference to accompanying drawings. Here, FIG. 1 is an exploded perspective view of a front end of a vehicle; FIG. 2 is a perspective view of a stay on a right side of a vehicle body; FIG. 3 is a cross-sectional view taken along the line III—III in FIG. 1; and FIG. 4 is a cross-sectional view taken along the line IV—IV in FIG. 1.

Reference numeral 1 in FIG. 1 denotes a frontal vehicle body frame constituting a vehicle body frame. Front wheel aprons 2 are formed on both sides of the frontal vehicle body frame 1 in a widthwise direction of the vehicle so as to define both sides of an engine room. Moreover, front side members 3 are provided on the right and the left at bottoms of the front wheel aprons 2.

Moreover, front end portions 2c including headlamp fitting portions 2b are joined to the front of the front wheel aprons 2 on the right and the left sides. An opening 4 is formed between the front end portions 2c. A frontal edge of the front side member 3 protrudes further forward than the front end portion 2c, and a module carrier 5, which constitutes a front end panel together with the front end portions 2c, is fitted and fixed onto the both front side members 3 so as to place at the opening 4.

The module carrier 5 includes a carrier upper frame 6 and a carrier lower frame 7 on the top and the bottom thereof. The carrier upper frame 6 and the carrier lower frame 7 are joined with a pair of stays 8a and 8b disposed on both sides of the frames 6 and 7, thus constituting an integrated frame structure. Here, the module carrier 5 may be also an integrally molded member using plastics or the like.

In an assembling process, the module carrier 5 is fitted onto the frontal vehicle body frame 1 so as to place at the opening 4 between the front end portions 2c. In an aperture formed in the center of the module carrier 5 and in the periphery of the aperture, auxiliary components for a cooling system, which are represented by a radiator unit 9 including a radiator and an air-conditioning condenser, a cooling fan 10 to be fixed at the back of the foregoing members, and the like, are fixed thereto in an assembled state. In this way, the module carrier 5 is modularized in advance.

As shown in FIG. 2 and FIG. 3, the stays 8a and 8b of the module carrier 5 have mutually symmetrical shapes, each of which is bent and formed into a Z-shaped cross section. In front of a vertical wall surfaces 11 opposite to each other, frontal flanges 12 are formed to bend outward. Moreover, back flanges 13 are formed behind the vertical wall surfaces 11 so as to bend inward. In addition, a front fitting face 12a as a first fitting face is formed on the midway of each of the frontal flanges 12.

As shown in FIG. 4, an upper portion of the frontal flange 12 of each of the stays 8a and 8b is formed into a tapered shape spreading downward, so that the upper portion is formed continuously to the front fitting face 12a. Moreover, a lower portion of the frontal flange 12 extends vertically downward from the front fitting face 12a. Meanwhile, a portion of the back flange 13 which is lower than a position corresponding to the front fitting face 12a is formed into a tapered shape extending downward. Therefore, regarding the vertical wall surface 11, a second width W2 between the front fitting face 12a and a back fitting face 13a is formed wider than a first width W1 of a lower part of the vertical wall surface 11.

Moreover, the back flange 13 positioned on the back of the front fitting face 12a constitutes the back fitting face 13a as a second fitting face, and a bolt inserting hole 13b as shown in FIG. 2 is drilled on the second fitting face 13a.

Meanwhile, as shown in FIGS. 1 and 2, the bolt inserting holes 12b are drilled on upper and lower outsides of the front fitting face 12a and on a lower inside thereof. In addition, a screw hole 12c is drilled on an upper inside thereof.

Moreover, the carrier upper frame 6 is formed to have a groove cross section and a downward opening, and upper ends of the stays 8a and 8b are fitted and joined inside the opening. Meanwhile, the carrier lower frame 7 is formed to have the groove cross section and the backward opening. Here, a bottom frame 7a of the carrier lower frame 7 extends further backward than an upper frame 7b thereof. The radiator unit 9 is mounted on the bottom frame 7a. In addition, a flange 7c is formed on a back end of the upper frame 7b of the carrier lower frame 7 so as to bend upward.

As shown in FIG. 2, hatched regions on upper ends of the stays 8a and 8b are joined to an inner surface of the carrier upper frame 6. Moreover, hatched regions on lower parts of the stays 8a and 8b are joined to the flange 7c formed on the carrier lower frame 7.

Radiator fitting brackets 15 for fixing an upper surface of the radiator unit 9 are fixed onto a front face of the carrier upper frame 6. Moreover, a latch fitting bracket 16 is fixed in the center of the carrier upper frame 6. Note that a latch to be fixed onto the latch fitting bracket 16 and a hood striker (not shown) to be fixed onto a front end of an engine hood 17 (see FIG. 4) collectively constitute a hood locking system. A closed state of the engine hood is maintained by retaining the hood striker with the latch.

Moreover, member plates 18 for abutting on the front fitting face 12a are fixed on the respective front side members 3. On each member plate 18, drilled are screw holes 18a, which correspond to the bolt-inserting holes 12b drilled on the front fitting face 12a, and a pilot hole 18b corresponding to the screw hole 12c. In addition, a lower end of a frame 19 with a hat-shaped cross section is fixed on each of side faces of the front side members 3 opposite to each other. An upper end of the frame 19 is fixed onto an opposite end of the headlamp fitting portion 2b. On mutually opposite faces at lower parts of the both frames 19, fixed is a member bracket 20 to abut on the second fitting faces 13a provided on the back flanges 13, which constitute the stays 8a and 8b.

As shown in FIG. 3, a distance between the member plate 18 fixed onto the front face of the front side member 3 and the member bracket 20 is setted to an almost equal dimension as the second width W2 of the stay 8a or 8b. Accordingly, when the module carrier 5 is placed in the opening 4, a back face of the front fitting face 12a abuts on the member plate 18 and a back face of the second fitting face 13a abuts on the member bracket 20. A weld nut 20a is fixed onto a back face of the member bracket 20 (see FIG. 4). Note that bolt-inserting holes 21 are drilled on the carrier upper frame 6 so that the carrier upper frame 6 is fastened to an upper face of the headlamp fitting portion 2b directly or via a bracket (not shown) with bolts.

Beam brackets 25, which are provided on the front bumper beam 24 extending in the widthwise direction of the vehicle, abut on front faces of the front fitting faces 12a. On each of the beam brackets 25, drilled are bolt-inserting holes 25a corresponding to the bolt-inserting hole 12b and the screw hole 12c drilled on the front fitting face 12a.

With respect to the screw hole 12c drilled on the front fitting face 12a, a bolt 27 with a pilot pin 27a formed integrally at its tip is passed through and screwed into the bolt-inserting hole 25a drilled on the beam bracket 25 of the front bumper beam 24, whereby a tip of the pilot pin 27a protrudes out of the back face of the front fitting face 12a backward.

Moreover, as shown in FIG. 4, an upper-stage shock absorber 28 and a lower-stage shock absorber 29 abut on front faces of the front bumper beam 24 and the carrier lower frame 7, respectively. Front sides of the shock absorbers 28 and 29 are covered with a bumper fascia 30 made of an elastic member such as plastics. The shock absorbers 28 and 29 are made of foamed materials having given foaming factors, such as polyurethane foam or polypropylene foam.

Here, as shown in FIG. 4, the upper-stage shock absorber 28 is disposed in a position almost corresponding to a knee joint of a leg of a pedestrian (a leg impacter K for hitting test is illustrated as a model of a human leg in the drawing). A foaming factor and a cross-sectional area of the upper stage shock absorber 28 are setted such that the shock absorber 28 is deformed to absorb the shock applied to the knee joint when the front of the vehicle body hits the leg of the pedestrian. Meanwhile, since the lower stage shock absorber 29 absorbs an impact energy against rigid members such as wall faces and the vehicle, a foaming factor and a cross-sectional area of the lower stage shock absorber 29 are setted to create higher rigidity than that of the upper stage shock absorber 28 in a longitudinal direction of the vehicle body, so as to scoop up a lower leg of the pedestrian responsive to an impact.

In this case, an impact load to be transmitted from the lower stage shock absorber 29 is received by the carrier lower frame 7 which supports the lower stage shock absorber 29. Accordingly, a front part of the carrier lower frame 7 protrudes forward so that a sufficient reactive force can be transferred to the lower stage shock absorber 29. Note that a front edge of the carrier lower frame 7 is setted at a slightly backward position from a front end of the front bumper beam 24 in this embodiment.

Next, a function of the embodiment of the foregoing structure will be described. Auxiliary components mainly composed of the radiator unit 9 including the radiator and the air-conditioning condenser are fitted onto the module carrier 5 in advance, whereby these components are modularized beforehand.

Moreover, the front bumper beam 24 is fitted temporarily to a front part of the module carrier 5. Now, procedures for temporarily fitting the front bumper beam 24 will be described in the following.

First, the beam brackets 25 fixed onto both sides of the front bumper beam 24 are allowed to abut on the front fitting faces 12a formed in front of the stays 8a and 8b arranged on the both sides of the module carrier 5. Then, the bolts 27 are inserted from the front side of the vehicle body into the bolt-inserting holes 25a drilled on the upper part of the inner side thereof out of the bolt-inserting holes 25a drilled on the beam bracket 25. In this way, the bolt 27 is screwed into the screw hole 12c drilled on the front fitting faces 12a of each of the stays 8a and 8b, and the front bumper beam 24 is thereby fitted temporarily to the module carrier 5. In this case, the pilot pin 27a formed on the tip of each bolt 27 protrudes backward from the back face of the second fitting face 12a.

Meanwhile, the vehicle body frame traveling on an assembly line has the opening 4, which is provided between the front end portions 2c. Accordingly, it is possible to perform inserting into an engine room not only from top and bottom directions of the vehicle body but also from a frontal direction thereof.

Thereafter, when the vehicle body frame is conveyed to a processing section for installing the module carrier 5, the module carrier 5, in which the peripheral auxiliary components for the cooling system are integrated and modularized in advance, is placed at the opening 4 provided between the front end portions 2c.

Upon fitting, the pilot pins 27a of the bolt 27 protruding from the back faces of the second fitting faces 12a provided on the module carrier 5 are inserted into the pilot holes 18b on the member plates 18 fixed onto the front ends of the front side members 3 of the front vehicle body frame 1.

Then, the module carrier 5 is piloted to the space between the front end portions 2c, whereby the back faces of the front fitting faces 12a abut on the member plates 18 provided on the tips of the front side members 3, and the back faces of the second fitting faces 13a abut on the member brackets 20 fixed onto the side faces of the front side members 3. Then, the respective bolt-inserting holes 25a drilled on the beam brackets 25 and the respective bolt-inserting holes 12b drilled on the front fitting faces 12a coincide with the screw holes 18a drilled on the member plates 18. Moreover, the bolt-inserting holes 13b drilled on the second fitting faces 13a coincide with the weld nuts 20a fixed onto the member brackets 20.

Incidentally, the relatively rigid front bumper beam 24 supports the bolts 27 with the pilot pin. Accordingly, if a distance between the pair of the front side members 3 is fluctuated to some extent, such fluctuation can be corrected by inserting the pilot pins 27a on the module carrier 5 into the pilot holes 18b on the front bumper beam 24.

Subsequently, bolts (not shown) are inserted into three bolt-inserting holes 25a drilled on each of the beam brackets 25 except the bolt-inserting hole 25a where the bolt 27 is inserted, and into the bolt-inserting holes 12b drilled on each of the front fitting faces 12a, whereby the bolts are further screwed into the screw holes 18a provided on each of the member plates 18. In this way, the front fitting faces 12a of the modular carrier 5 are attached and fixed between the member plates 18 and the beam brackets 25. Moreover, the bolts inserted into the bolt-inserting holes 13b drilled on the back fitting faces 13a are further screwed into the weld nuts 20a fixed onto the member brackets 20 in order to fix the back fitting faces 13a.

Meanwhile, both ends of the carrier upper frame 6 are fixed onto the front end portions 2c either directly or via brackets (not shown).

Thereafter, back faces of the upper stage shock absorber 28 and the lower stage shock absorber 29 are fixed onto the front end face of the front bumper beam 24 and the front end face of the carrier lower frame 7, respectively. Further, the both shock absorbers 28 and 29 are covered with the bumper fascia 30, which constitutes a part of a shape of the vehicle body. Then, an upper part and a lower part of the bumper fascia 30 are fixed onto the module carrier 5 and to the front end portions 2c to complete assembly around the front end panel. In this case, the lower part of the bumper fascia 30 may be allowed to extend downward under the bottom frame 7a of the carrier lower frame 7 and fixed onto the bottom frame 7a with clips or bolts.

Next, description will be made regarding an operation of the front end of the vehicle body thus assembled in the event of hitting the leg impacter K from the front side of the vehicle body.

When the leg impacter K hits the front of the vehicle body, a part of the upper stage shock absorber 28 colliding on the vicinity of the knee joint of the leg impacter K is subjected to plastic deformation, whereby the impact energy upon collision is absorbed. Meanwhile, the lower stage shock absorber 29 has more rigidity than that of the upper stage shock absorber 28, which is attributable to a formation under a lower foaming factor than the upper stage shock absorber 28. In addition, the front end face of the carrier lower frame 7 abutting on the back face of the lower stage shock absorber 29 protrudes to the position being slightly setted back from the front end face of the front bumper beam 24. Accordingly, a thickness of the lower stage shock absorber 29 is reduced and an amount of the deformation upon receipt of the impact is thereby suppressed.

Therefore, the front end face of the carrier lower frame 7 can receive the impact load received by the lower stage shock absorber 29, and a sufficient reactive force against the leg can be generated. In this case, the rigidity on the lower part of the bumper fascia 30 can be enhanced by fixing the lower part to the bottom frame 7a with the clips or the bolts. Accordingly, the bumper fascia 30 can also generate some reactive force by its own rigidity.

As a result, as illustrated with arrows in FIG. 4, an upper part of the leg impacter K is inclined onto the engine hood 17 of the vehicle body owing to the deformation of the upper stage shock absorber 28, and a lower part of the leg impacter K is scooped up by the reactive force of the lower stage shock absorber 29. Accordingly, it is possible to protect the lower leg of the pedestrian from injury.

Incidentally, as shown in FIG. 4, when the impact load from the lower leg of the leg impacter K is applied to the front end of the carrier lower frame 7, the impact load is transmitted to lower parts of the stays 8a and 8b via the flange 7c formed by bending on the rear end of the upper frame 7b of the carrier lower frame 7. Then, the impact load is received by the member plates 18 fixed onto the front ends of the front side members 3 abutting on the front fitting faces 12a, which are formed on the stays 8a and 8b.

In this stage, the impact load eventually causes bending moments on the stays 8a and 8b fixing the carrier lower frame 7 on the lower ends thereof, in a counterclockwise direction according to FIG. 4 while taking the front fitting faces 12a as pivots. However, the back fitting faces 13a, which are formed closer to the rear end than that of the front fitting faces 12a, are fixed onto the member brackets 20 being fixed onto the front side members 3. In addition, the second width W2 between the front fitting face 12a and the back fitting face 13a is formed wider than the first width W1 at the lower part of the vertical wall surface 11. Therefore, the lower parts of the stays 8a and 8b are supported by truss structures against the front side members 3, and the stays 8a and 8b can receive the impact load applied from the carrier lower frame 7 securely with an increased strength.

It should be understood that the present invention is not limited to the particular embodiment as described above. For example, the bolt 27 may be substituted by an eyebolt associated with a pilot pin. Use of such eyebolt can impart a pulling function as well. Otherwise, a screw hole may be provided on a head of the bolt 27 so as to effectively engage the eyebolt. Meanwhile, the module carrier may include an entire front end panel including the headlamp fitting portions.

Further, pins or bolts having piloting functions may be provided on the front ends of the front side members 3 in a protruding manner, and the pilot holes for allowing insertions of the foregoing pins or bolts may be drilled on the front fitting faces 12a formed on the stays 8a and 8b constituting the module carrier 5 and on the beam brackets 25.

As described above, according to the present invention, if at least the part of the front end panel is composed of the module carrier of separate components, rigidity against the impact load applied from the front side of the vehicle body to the lower end of the module carrier can be enhanced so as to receive the impact load firmly.

Moreover, since the rigidity against the impact load is enhanced, the sufficient reactive force can be generated against the impact load if the front of the vehicle body hits the leg of the pedestrian. Such reactive force is effective for scooping up the leg of the pedestrian, and the leg can be thereby protected.

While there have been described what are at present considered to be preferred embodiments of the present invention, it will be understood that various modifications may be made thereto, and it is intended that the appended claims cover all such modifications as fall within the true spirit and scope of the present invention.

What is claimed is:

1. A front end structure of a vehicle provided with a module carrier with a carrier upper frame and a carrier lower frame each extending in a widthwise direction of the vehicle and a stay extending in a vertical direction to connect both side ends of the two frames, the module carrier being fixed onto a front part of a vehicle body frame with at least a part of a front end, comprising:

a first fitting face provided on the stay; and a second fitting face provided on the same stay on which the first fitting face is provided and on a side closer to a rear end of a vehicle body than the first fitting face, the both fitting faces being fixed onto the vehicle body frame.

2. The front end structure of the vehicle according to claim 1, further comprising:

a front bumper beam extending in the widthwise direction of the vehicle and fastened to the vehicle body frame so as to sandwich the first fitting face together with the vehicle body frame.

3. The front end structure of the vehicle according to claim 2, wherein:

the front bumper beam is temporarily fitted onto the first fitting face with a temporary fastener; and a pilot pin is provided on a tip of the temporary fastener so as to be engaged into a pilot hole formed on a front portion of the vehicle body frame.

4. The front end structure of the vehicle according to claim 2, wherein:
   the front bumper beam is temporarily fitted onto the first fitting face with a temporary fastener;
   a pilot member is formed to protrude on a front edge of the vehicle body frame; and
   at least either one of the first fitting face or the front bumper beam has a pilot hole engaged with the pilot member.

5. The front end structure of the vehicle according to claim 2, further comprising:
   an upper stage shock absorber provided on a front face of the front bumper beam; and
   a lower stage shock absorber provided on a front face of the carrier lower frame, wherein:
      a front part of the carrier lower frame protrudes further forward of the vehicle body than a front part of the carrier upper frame; and
      a rigidity in a longitudinal direction of the lower stage shock absorber is setted higher than one of the upper stage shock absorber.

6. The front end structure of the vehicle according to claim 3, further comprising:
   an upper stage shock absorber provided on a front face of the front bumper beam; and
   a lower stage shock absorber provided on a front face of the carrier lower frame, wherein:
      a front part of the carrier lower frame protrudes further forward of the vehicle body than a front part of the carrier upper frame; and
      a rigidity in a longitudinal direction of the lower stage shock absorber is setted higher than one of the upper stage shock absorber.

7. The front end structure of the vehicle according to claim 4, further comprising:
   an upper stage shock absorber provided on a front face of the front bumper beam; and
   a lower stage shock absorber provided on a front face of the carrier lower frame, wherein:
      a front part of the carrier lower frame protrudes further forward of the vehicle body than a front part of the carrier upper frame; and
      a rigidity in a longitudinal direction of the lower stage shock absorber is setted higher than one of the upper stage shock absorber.

8. The front end structure of the vehicle according to claim 1, wherein:
   components for a cooling system are integrated on the module carrier.

9. The front end structure of the vehicle according to claim 2, wherein:
   components for a cooling system are integrated on the module carrier.

10. The front end structure of the vehicle according to claim 3, wherein:
    components for a cooling system are integrated on the module carrier.

11. The front end structure of the vehicle according to claim 4, wherein:
    components for a cooling system are integrated on the module carrier.

12. The front end structure of the vehicle according to claim 5, wherein:
    components for a cooling system are integrated on the module carrier.

* * * * *